US010296584B2

(12) United States Patent
Ducatel et al.

(10) Patent No.: US 10,296,584 B2
(45) Date of Patent: May 21, 2019

(54) SEMANTIC TEXTUAL ANALYSIS

(75) Inventors: Gery M Ducatel, London (GB); Simon G Thompson, London (GB); Marcus Thint, London (GB)

(73) Assignee: British Telecommunications PLC, London (GB)

( * ) Notice: Subject to any disclaimer, the term of this patent is extended or adjusted under 35 U.S.C. 154(b) by 1507 days.

(21) Appl. No.: 13/576,076

(22) PCT Filed: Jan. 27, 2011

(86) PCT No.: PCT/GB2011/000102
§ 371 (c)(1),
(2), (4) Date: Jul. 30, 2012

(87) PCT Pub. No.: WO2011/092465
PCT Pub. Date: Aug. 4, 2011

(65) Prior Publication Data
US 2012/0303358 A1  Nov. 29, 2012

(30) Foreign Application Priority Data
Jan. 29, 2010  (GB) .................................. 10250157.4

(51) Int. Cl.
*G10L 15/22* (2006.01)
*G06F 17/27* (2006.01)
*G06F 16/30* (2019.01)
*G06F 17/22* (2006.01)

(52) U.S. Cl.
CPC .......... *G06F 17/2785* (2013.01); *G06F 16/30* (2019.01); *G06F 17/2211* (2013.01); *G06F 17/274* (2013.01)

(58) Field of Classification Search
CPC ..... G10L 15/18; G10L 15/1815; G10L 15/22; G06F 17/27; G06F 17/2775; G06F 17/2785
USPC ........................................................ 704/275
See application file for complete search history.

(56) References Cited

U.S. PATENT DOCUMENTS

| 5,477,451 | A  | * | 12/1995 | Brown et al. ..................... 704/9 |
| 6,167,370 | A  |   | 12/2000 | Tsourikov et al. |
| 7,177,799 | B2 |   | 2/2007  | Calcagno et al. |
| 2002/0032564 | A1 |   | 3/2002 | Ehsani et al. |
| 2003/0004716 | A1 |   | 1/2003 | Haigh et al. |
| 2003/0130837 | A1 | * | 7/2003 | Batchilo et al. .................. 704/9 |
| 2003/0144831 | A1 | * | 7/2003 | Ford ................................. 704/9 |
| 2003/0217052 | A1 | * | 11/2003 | Rubenczyk et al. ............. 707/3 |

(Continued)

FOREIGN PATENT DOCUMENTS

WO    2005/122145    12/2005

OTHER PUBLICATIONS

International Search Report for PCT/GB2011/000102 dated Feb. 21, 2011.

(Continued)

*Primary Examiner* — Michael N Opsasnick
(74) *Attorney, Agent, or Firm* — Nixon & Vanderhye PC

(57) ABSTRACT

A method of comparing the semantic similarity of two different text phrases in which the grammatical structure of the two different text phrases is analyzed and a keyword set for each of the different text phrases is derived The semantic similarity of the phrases can be determined in accordance with the grammatical structure of the two different text phrases and the contents of the two keyword sets.

20 Claims, 3 Drawing Sheets

(56) References Cited

U.S. PATENT DOCUMENTS

| | | |
|---|---|---|
| 2006/0036430 A1 | 2/2006 | Hu |
| 2007/0073533 A1 | 3/2007 | Thione et al. |
| 2007/0281286 A1* | 12/2007 | Palacios Orueta ........... 434/185 |
| 2009/0197225 A1* | 8/2009 | Sheehan et al. .............. 434/169 |

OTHER PUBLICATIONS

Agichtein et al., "Combining Lexical, Syntactic, and Semantic Evidence for Textual Entailment Classification", Proceedings of the First Text Analysis Conference (TAC 2008), Nov. 17, 2008, Nov. 19, 2008, pp. 1-6.

Achananuparp et al., "Addressing the Variability of Natural Language Expression in Sentence Similarity with Semantic Structure of the Sentences", Advance in Knowledge Discovery and Data Mining, Apr. 21, 2009, pp. 548-555.

The Stanford Natural Language Processing Group, Stanford Log-linear Part-Of-Speech Tagger retrieved from: http://nlp.stanford.edu/software/tagger.shtml; Aug. 2004 (3 pgs.).

The Stanford Natural Language Processing Group, The Stanford Parser: A statistical parser retrieved from: http://nlp.stanford.edu/downloads/lex-parser.shtml; Dec. 2002 (6 pgs.).

The Berkeley Natural Language Processing Group, Historical Linguistics, Berkeley NLP Group retrieved from: http://nlp.cs.berkeley.edu/Main.html#parsing; date unknown (1 pg.).

KEA keyphrase extraction algorithm Overview, retrieved from: http://www.nzdl.org/Kea/; date unknown (1 pg.).

M. F. Porter, "An algorithm for suffix stripping", Paper No. 3, pp. 130-137, Jul. 1980.

Dimitrov e al., "A Light-weight Approach to Coreference Resolution for Named Entities in Text", Ontotext Lab, Sirma AI and Department of Computer Science, University of Sheffield, Sheffield Natural Language Processing slide presentation, date unknown (11 pgs.).

WordNet A lexical database for English, "What is WordNet?", retrieved from http://wordnet.princeton.edu/, The Trustees of Princeton University, Dec. 27, 2012 (3 pgs.).

The Stanford Natural Language Processing Group, Named Entity Recognition (NER) and Information Extraction (IE), retrieved from: http://nlp.stanford.edu/ner/index.shtml; date unknown (2 pgs.).

Google Search Engine page retrieved from http://www.google.com on Jan. 10, 2013 (1 pg.).

Yahoo Search Engine page retrieved from http://www.yahoo.com on Jan. 10, 2013 (1 pg.).

Hotmail Search Engine page retrieved from http://nlp.stanford.edu/ner/index.shtml on Feb. 25, 2013 (1 pg.).

Ask Search Engine page retrieved from http://www.ask.com/ on Feb. 25, 2013 (1 pg.).

Deerwester, S. Dumais, G. W. Furnas, T. K. Landauer, R. Harshman (1990). "Indexing by Latent Semantic Analysis" *Journal of the American Society for Information Science* 41 (6): 391-407 (17 pgs.).

T. Hofmann, "Probabilistic Latent Semantic Indexing", *Proceedings of the Twenty-Second Annual International SIGIR Conference on Research and Development in Information Retrieval* (SIGIR-99), 1999, (8 pgs.).

D. M. Blei, A. Y. Ng, and M. I. Jordan, "Latent Dirichlet Allocation", *Journal of Machine Learning Research.* 3:993-1022. Mar. 2003, (30 pgs.).

V. A. Poroshin, "Semantic analysis of Natural Language", Paper, date unknown (14 pgs.).

Amer-Yahia, M. Fernandez, D. Srivastava, and Y. Xu. "PIX: Exact and Approximate Phrase Matching in XML", *Proceedings of the ACM SIGMOD International Conference on Management of Data*, pp. 664-667, 2003. (http://citeseer.ist.psu.edu/592305.html) (1 pg.).

T. Padgett, A. Maniquis, M. Hoffman, W. Miller and J. Lautenschlager. "A Semantic Visualization Tool for Knowledge Discovery and Exploration in a Collaborative Environment", ISX Corporation, 4301 N. Fairfax Drive, Suite 370, Arlington, VA, 22203, USA, date unknown, (2 pgs.).

B S. W.K. Chan, "Beyond keyword and cue-phrase matching: A sentence-based abstraction technique for information extraction", *Decision Support Systems*, vol. 42, Issue 2, Nov. 2006, pp. 759-777, Jun. 28, 2005.

M. S. Pera and Y. K. Ng. "Finding Similar RSS News Articles Using Correlation-Based Phrase Matching", pp. 336-348, 2007 (13 pgs.).

English Idioms & Idiomatic Expressions, UE UsingEnglish.com, English Language (ESL) Learning, retrieved from http://www.usingenglish.com/reference/idioms/ on Feb. 25, 2013.

The Online Slang Dictionary (American, English, and Urban slang) retreived from http://onlineslangdictionary.com/browse/s on Feb. 25, 2013.

Achananuparp, P., et al. Addressing the Variability of Natural Language Expression in Sentence Similarity with Semanitc Structure of the Sentences, College of Information Science and Technology, Drexel University, Philadelphia, pp. 548-555, 2009.

Agichtein, E., et al. "Combining Lexical, Syntactic, and Semantic Evidence for Textual Entailment Classification", Emory University, date unknown (6 pgs.).

Mihai C. Lintean and Vasile Rus, "Paraphrase Identification Using Weighted Dependencies and Word Semanitcs", Informatioa 34 (2010) pp. 19-28.

English modal verbs, Wikipedia, the free encyclopedia, retrieved on Feb. 26, 2013 from http://en.wikipedia.org/wiki/English_modal_auxiliary_verb (14 pgs.).

List of city nicknames in the United States, Wikipedia, the free encyclopedia, retrieved on Feb. 26, 2013 from http://en.wikipedia.org/wiki/List_of_city_nicknames_in_the_United_States (59 pgs.).

\* cited by examiner

SEMANTIC TEXTUAL ANALYSIS

This application is the U.S. national phase of International Application No. PCT/GB2011/000102 filed 27 Jan. 2011 which designated the U.S. and claims priority to GB 10250157.4 filed 29 Jan. 2010, the entire contents of each of which are hereby incorporated by reference.

BACKGROUND AND SUMMARY

The present invention relates to a method of analysing textual phrases and in particular to a method of analysing the semantic content of textual phrases and determining semantic similarities between those phrases.

Information that is stored and organized within databases is conventionally referred to as structured information, whereas information that is described in natural language text is often referred to as unstructured, since many concepts can be expressed in multiple, and often imprecise ways, using natural language. There are a number of useful applications that are dependent upon the capability to process and analyse unstructured, natural language content, for example information retrieval (IR), document analysis and understanding, text summarization, machine translation, and question answering.

Natural Language Processing (NLP) tools are known, but methods and systems for Natural Language Understanding (NLU), question answering (QA) and advanced information retrieval (aIR) remain open topics in Computer Science. Given a passage of text, NLP tools can identify sentences, tag the parts of speech of words in that sentence, parse the sentence structure to identify grammatical components like noun and verb phrases, extract keywords, provide stemmed root words, resolve co-references, provide synonyms, perform named entity recognition (NER), and perform basic information retrieval like keyword-based search engines. However, advanced IR requires processing at the semantic level, which takes into consideration the meaning of phrases and sentences.

According to a first aspect of the present invention there is provided a method of determining a degree of semantic similarity between a first text phrase and a second text phrase, the method comprising the steps of: analysing the grammatical structure of the first text phrase and the second text phrase; processing the first text phrase to generate a first keyword set; processing the second text phrase to generate a second keyword set; and determining the semantic similarity between the first and second text phrases based on (i) the similarities between the grammatical structure of the first text phrase and the second text phrase; and (ii) the similarities between the first and second keyword sets.

If any idiomatic expressions are detected in step a), then one or more alternative expressions with a similar meaning to the or each idiomatic expressions may be identified. Step a) may comprise the parsing of the grammatical structure of each text phrase and inserting part of speech tags in accordance with the results of the parsing.

In steps b) and c) said first and second keyword sets may be generated by removing one or more stopwords from the respective text phrases. Steps b) and c) may also generate said first and second keyword sets by stemming the words comprising the respective text phrases.

The semantic similarity between the first and second text phrases may be used to determine the similarity of a first document to a second document. Furthermore, the decision to retrieve one or more documents may be made in accordance with the semantic similarity between the first and second text phrases.

Thus, if a requested phrase can be determined to be sufficiently similar to a key phrase which is associated with one or more documents, the or each document associated with the key phrase may be returned to the requester.

In an alternative application of the present invention, the semantic similarity between the first and second text phrases may be used to provide one or more answers in response to a received question.

Thus, in a support system, if a received question can be determined to be semantically similar to one or more questions that have been received previously then it is possible to respond automatically to the received question by returning answers that have previously been determined to be relevant to the received question.

According to a second aspect of the present invention there is provided an apparatus comprising a central processing unit, volatile data storage means and non volatile data storage means, the apparatus being configured to perform a method as described above.

According to a third aspect of the present invention there is provided a data carrier device comprising computer executable code for performing a method as described above.

BRIEF DESCRIPTION OF THE DRAWINGS

Embodiments of the present invention will now be described, by way of example only, with reference to the accompanying drawings in which.

DETAILED DESCRIPTION OF PRESENT EXAMPLE EMBODIMENTS

Figure 1:
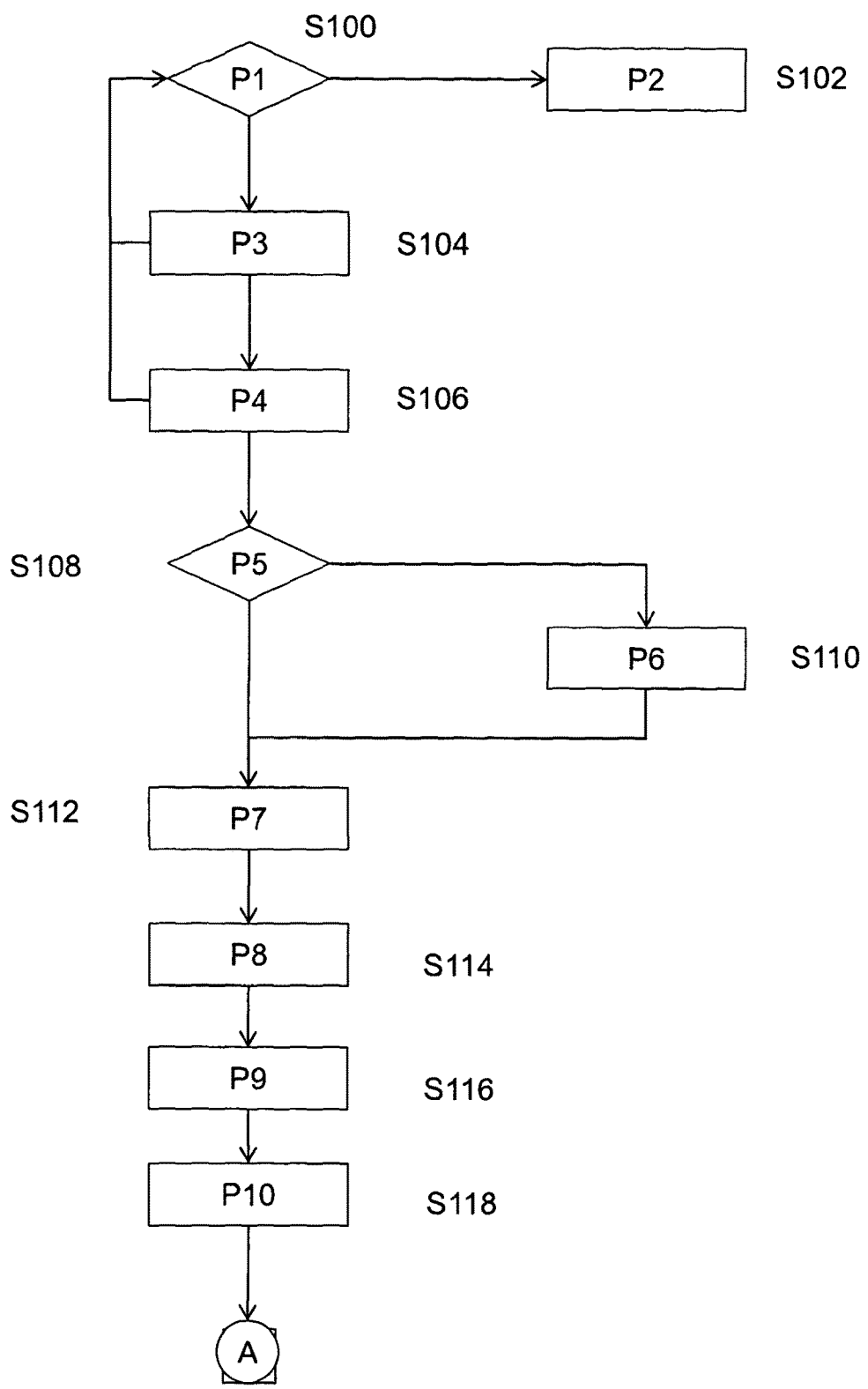
FIGS. 1 and 2 show a schematic depiction of a method according to a first embodiment of the present invention.
Figure 2:
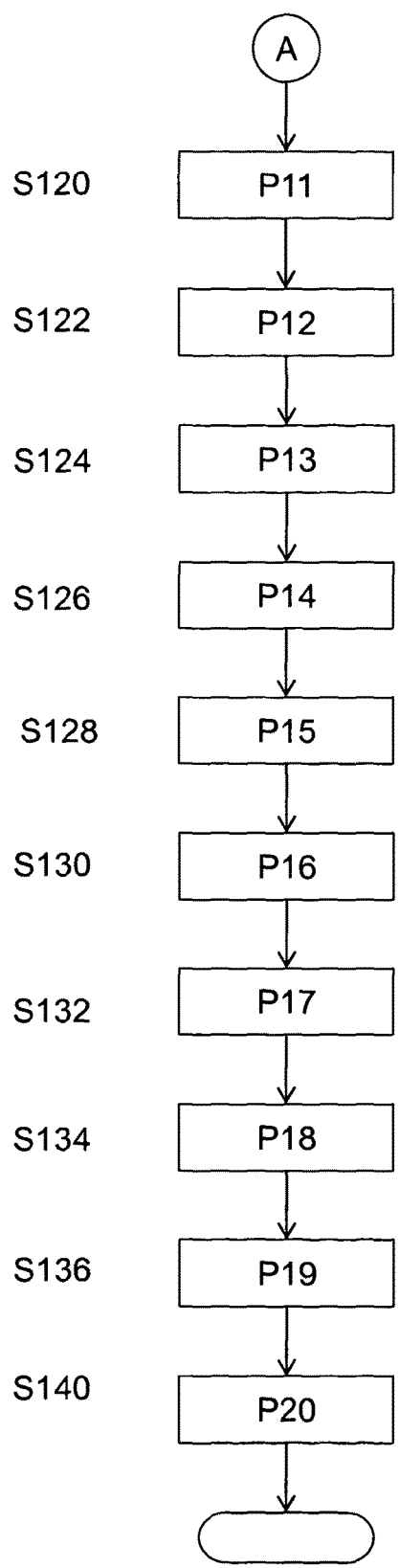

FIGS. 1 and 2 show a schematic depiction of a method according to a first embodiment of the present invention. The depiction of the method in a flow chart begins in FIG. 1 and terminates in FIG. 2. It will be seen that the method according to the first embodiment of the preset invention is formed from a number of different processes, which will be referred to, for the sake of clarity, as P1 through to P20 respectively.

The present invention provides a method by which two text passages can be compared in order to determine the semantic similarity (or differences) between the text passages. The text passages may comprise a short phrase, a complete sentence, or multiple sentences. The semantic similarity may be expressed numerically using a passage semantic similarity measure (PSSM) which may take a value from 0 to 1, with 1 denoting that the passages are literally identical and 0 indicating that there is no semantic similarity between the two passages.

The two text passages which are to be compared are received by P1 at step S100 and are compared to determine if there is an exact match between them (this comparison is case insensitive). If the phrases are determined to be identical then at P2 (stage S102) a PSSM value of 1 is assigned and the method terminates. If the phrases are not identical then the method continues to P3 (stage S104) in which any contractions in the phrases are detected and expanded: for example the term "we'll" is converted to "we will". A first flag is set to indicate that P3 has been performed and the method returns to P1 to determine whether the modified phrases are identical. For the case in which a contraction may have multiple expansions, for example "can't" can be expanded to both "can not" and "cannot", then phrases which contain both (or each) of the multiple expansions are returned to P1 to determine if the phrases are identical. If the phrases are not identical then the method will continue to P4 (as the flag that was set after the completion of P3 prevents P3 from being repeated).

P4 (step S106) detects acronyms in the phrases and expands the acronyms such that the phrase includes all the valid terms that correspond to the acronym. For example, the term 'FBI' is expanded to 'Federal Bureau of Investigation'. The method then returns to P1 such that the phrases can be compared to see if they are identical. A second flag is sent after the completion of P4 such that the process is not subsequently repeated. If the third instance of P1 does not detect that the phrases are the same then the method will continue to P5 (step S108). An exemplary operation of processes P1, P3 & P4 is shown below in Table 1.

TABLE 1

Example of operation of Processes P1, P3 & P4.

| Process | Phrase 1 | Phrase 2 | Exact match? |
|---|---|---|---|
| P1 | We'll send the package to Richard Wagoner, CEO of GM | We will send the package to Richard Wagoner, Chief Executive Officer of General Motors | No |
| P3 | We will send the package to Richard Wagoner, CEO of GM | We will send the package to Richard Wagoner, Chief Executive Officer of General Motors | No |
| P4 | We will send the package to Richard Wagoner, Chief Executive Officer of General Motors | We will send the package to Richard Wagoner, Chief Executive Officer of General Motors | Yes |

P5 (stage S108) detects whether the phrases supplied by P4 comprise multiple sentences; if they don't then the method continues to process P7 (step S112). If a phrase does contain multiple sentences then in P6 (stage S110) a coreference resolution tool is applied and any detected pronouns are replaced by the original named entity. For example, if an input phrase comprised;

"HP Officejet 7410 is ideal for home and office use. It combines a scanner, fax machine, copier, and photo printer into one compact machine"

then it would be modified to the following;

"HP Officejet 7410 is ideal for home and office use. HP Officejet 7410 combines a scanner, fax machine, copier, and photo printer into one compact machine"

and this phrase is then sent to process P7 (step S112).

In process P7, each input text is scanned for known idiomatic expressions, for example by searching a known set of idiomatic expressions, such as, for example, idioms.thefreedictionary.com) and slang expressions, and additional alternate phrases are generated. Consider the following two phrases:

TABLE 2

Exemplary text phrases

| Phrase A | the trainee contended for a spot in the special operations unit, but he did not meet required standards |
| Phrase B | although the cadet competed, he could not cut the mustard to serve in the special forces squad |

It is immediately apparent that these phrases are not literally identical and that both of these phrases have had any acronyms and/or contractions expanded. However, it would be clear to a speaker of English that the idiomatic expression "could not cut the mustard" is equivalent to the more formal phrase "could not meet the required standard". When an idiomatic phrase is detected in P7, one or more alternate phrases can then be generated and used to supplement the original phrase. In the present case, Phrase B can be written as:

TABLE 2A

Alternate phrase for Phrase B

| Phrase B | although the cadet competed, he could not cut the mustard to serve in the special forces squad/although the cadet competed, he could not meet the required standard to serve in the special forces squad |

A knowledge module of idioms and slang expressions, with corresponding equivalent phrases, can be compiled from sources for idioms and slang expressions used in multiple countries. Supplemental knowledge modules may be used to add jargon and/or terminology that is specific to particular domains (e.g. medicine, different technical fields, law etc.).

Process P8 (S114) applies a known technique for named entity recognition (NER) to the text phrases. NER techniques identify common entities such as dates, phone numbers, location, such as countries, counties, cities, etc., personal names, events etc. During the execution of process P8 a knowledge module comprising popular and commonly used named entities may be accessed. This may be augmented by one or more supplemental knowledge modules (see below) which are specific to a particular technical or commercial domain or application. In process P9 (S116), the grammatical structure of the text phrases are analysed using a parsing tool and parts of speech (POS) tags are subsequently assigned to the words in the text phrases, including hierarchical groupings such as entire noun phrases, verb phrases, prepositional phrases, etc. The results of processes P8 & P9 enable the subsequent identification and independent comparisons of noun phrases, verb phrases, prepositional phrases, etc. that occur within the text phrases.

In process P10 (step S118), equivalent entity labels are applied to entities that were named during process P8 (e.g. people, places, events) so that alternate names are recognized as being equivalent. Original entity labels are preserved, and extra copies of text sentences are generated for subsequent augmented comparisons. For example, terms such as "Robert Wagoner" and "Bob Wagoner" or "White House" and "1600 Pennsylvania Avenue" are identified as being equivalent.

Referring to FIG. 2, the method continues at process P11 (S120). During process P11, negation terms within the text phrases are identified and then marked, such that they are not then deleted within any of the subsequent phrases that comprise a method according to the present invention.

Typically, any arguments following the word 'not' are identified and marked, whilst any double negatives are deleted from the text phrases. Referring to the text phrases shown in Table 2 (see above), after the execution of process P11, and the identification of alternate phrases in process P7, they will be rewritten as shown in Table 3 below, with the words "not" being marked for non-removal as a stopword:

TABLE 3

Exemplary phrases following execution of P11

| | |
|---|---|
| Phrase A | the trainee contended for a spot in the special operations unit, but he did not (meet required standards) |
| Phrase B | although the cadet competed, he could not (meet required standard) to serve in the special forces squad |

The parts of speech (POS) tags that are generated by the output of the parser tool (see P9 above) can be used to ensure that different expressions of negation can be identified and marked. For example, when the parser tool is applied to Phrase B, as shown in Table 3 above, then the following results are obtained;

```
(ROOT
  (S
    (SBAR (IN although)
      (S
        (NP (DT the) (NN cadet))
        (VP (VBD competed))))
    (, ,)
    (NP (PRP he))
    (VP (MD could) (RB not)
      (VP (VB meet)
        (NP
          (NP (VBN required) (NN standard))
          (SBAR
            (S
              (VP (TO to)
                (VP (VB serve)
                  (PP (IN in)
                    (NP (DT the) (JJ special) (NNS forces)
    (NN squad))))))))))))
```

The tag 'VP' indicates a verb phrase, and the first verb phrase that follows the word 'not' will be the phrase that is negated by the word 'not'. In the marked up text above, the term 'meet required standard' is shown in bold as this is the first verb phrase following the word 'not', and the verb phrase before the clause introduced by a subordinating conjunction, which is indicated by the 'SBAR' tag. Process P11 is also able to access the contents of an exception knowledge module (see below) so that negation exception terms such as "fail to" or "except" are also identified and marked, as they express negation in a different manner. Thus, one of the outcomes of P11 is that an expression such as "cadet failed to meet required standard"

will be recognized as being equivalent to

"cadet could not meet required standard".

Process P12 (S122) recognizes and preserves important perception-based terms which relate to time, size, quantity, frequency, distance, temperature, sight, sound, smell, taste, touch, etc. such that they are not deleted by subsequent process P14 (S126), as the deletion of a single perception-based term could drastically change the meaning of phrases, and thus the outcome of any comparison results. For example, changing just a single frequency descriptor leads to significantly different meaning of the phrases "John frequently plays tennis" and "John seldom plays tennis". A perception term knowledge module comprises a list of terms in each of the categories mentioned above, associated with terms for both a similar meaning and an opposite meaning. Hence, terms such as "often" would be associated has having a similar meaning as "frequently", and the term "rarely" would be grouped as having the opposite meaning, together with terms such as "seldom". As this knowledge module would not comprise a large number of terms and associations then it would be feasible to manually pre-specify the contents of the perception term knowledge module.

Process P13 (S124) detects modal qualifiers, for example will, shall, may, can, must, ought, etc. which are present in the text passages, as well as any usuality and probabilistic constraints which might alter the meaning of natural language phrases. In a similar manner to the perception term knowledge module, a modal term knowledge module may be constructed which comprises positive and negative association sets for the various modal terms. The relatively small number of terms that are required mean that construction of such a knowledge module is not an onerous task.

Processes P14-P17 perform a number of transformations on the text phrases. Process P14 (S126) detects and removes stopwords from the phrases. The resulting phrases are then stemmed in process P15 (S128), before the keywords are extracted from the phrases in process P16 (S130) and then those extracted keywords are expanded such that they are associated with relevant keywords (process P17, S132). It is preferred that the keyword extraction performed during process P16 is performed on the original text phrase, that is a copy of the text that is the input to process P1.

These operations are illustrated below in Table 4 with reference to the two text phrases that were discussed above in Tables 2 & 3:

TABLE 4

Exemplary operation of processes P14-P17

| | | | |
|---|---|---|---|
| | Input to P14 | the trainee contended for a spot in the special operations unit, but trainee did not (meet required standards) | B1: although the cadet competed, cadet could not (cut the mustard) to serve in the special forces squad<br>B2: although the cadet competed, cadet could not (meet required standards) to serve in the special forces squad |
| P14 | Stopword removal | trainee contended, spot, special operations unit, trainee, not (meet required standards) | B1: cadet competed, cadet, not (cut the mustard) serve special forces squad<br>B2: cadet competed, cadet, not (meet required standards) serve special forces squad |

TABLE 4-continued

Exemplary operation of processes P14-P17

| P15 | Stemming | trainee contend, spot, special operation unit,, trainee, not (meet required standards) | B1: cadet compete, cadet, not (cut the mustard), serve, special force squad<br>B2: cadet compete, cadet, not (meet required standards), serve, special force squad |
|---|---|---|---|
| P16 | Keyword extraction | trainee, special operations, not (meet required standards) | B1: cadet, not (cut the mustard), special forces squad<br>B2: cadet, not (meet required standards), special forces squad |
| P17 | Synonym expansion | trainee (contend, compete, vie) (spot, position, post, berth, office) (special, particular, peculiar, especial, exceptional, limited, extra) (operation, military operation, surgery, surgical operation, procedure, functioning, performance) not ((meet, satisfy, fulfil) (required, needed, compulsory) (standards, criterion, measure, touchstone)) | B1: (cadet, plebe, military trainee) (compete, vie, contend) cadet not ((cut, separate, reduce, trim) (mustard, table mustard, Indian mustard)) (serve, function, help, attend to, wait on, assist, process, swear out) (special, particular, peculiar, especial, exceptional, limited, extra) (forces, personnel, military unit, military group) (squad, smallest army unit)<br>B2: (cadet, plebe, military trainee) (compete, vie, contend) cadet not ((meet, satisfy, fulfil) (required, needed, compulsory) (standards, criterion, measure, touchstone)) (special, particular, peculiar, especial, exceptional, limited, extra) (forces, personnel, military unit, military group) (squad, smallest army unit) |

In process P18 (S134), the selected keywords are grouped into N-grams for or further comparison of compound terms such as "special forces". Matching synonyms from P17 are replaced in the output phrase generated by process P14 and n-gram analysis is then invoked for N=1, 2, 3. Where the text phrase comprises multiple alternate phrases (for example, B1 and B2 as shown in Table 4 above), the alternate phrase that has the most matches will be selected for propagation to the next stage.

Process P19 (S136) extends the semantic analysis to check for equivalent N-gram terms from an explanatory data source (for example Wikipedia). For the example shown above in Tables 2-4, the term "special operations" is found to be related to "special forces" during P19.

During process P19 (S136), n-grams from the unmatched portions of the phrase (e.g. for B2, the phrases "serve" and "special forces squad") are further expanded to seek potential matches. This expansion process entails searching for the terms in an explanation/discussion source (for example Wikipedia). To reduce the possibility that the value of this process is reduced by excessive noise (effectively checking the N-gram terms against too many or irrelevant words) then the explanatory data source is limited, for example to the first few lines or sentences from the reference article or explanatory data source. The procedure starts with the largest (N=3) triplet "special forces squad", and (when no matching explanation is found) repeats the process for N=2, and tries "special forces". The explanation sentence is in the form X and Y are Z; hence it is logical to infer X ("special forces") and Y ("special operations forces) are semantically related.

The result of P19 is a semantic key phrase set, which can then be used in P20 (S140) for the calculation of a numerical indicator of the similarity of the two phrases under consideration. After all the processing described above, the semantic key phrase sets derived from the example phrases under discussion are:

TABLE 5

Exemplary text phrases & semantic key phrase sets

| | Text Phrase | Semantic Key Phrase Set |
|---|---|---|
| Phrase A | the trainee contended for a spot in the special operations unit, but he did not meet required standards | {trainee, contend, spot, special operations unit, not (meet required standards)} |
| Phrase B | although the cadet competed, he couldn't cut the mustard to serve in the special forces squad | {trainee, contend, not (meet required standards), serve, special operations unit} |

Thus, the two original text phrases that were lexically very different have been found to be semantically very similar. In process P20 (S140), a numerical indication of this semantic similarity, the Phrase Semantic Similarity Metric (PSSM) is determined. The PSSM is based on an aggregation of results which are generated by some of the previous processes which comprise a method according to the present invention.

$$PSSM = \frac{1}{9}\left(\sum_{i \in A} w1_i \times S(i)\right) + \frac{w2 \times (KP_{match})}{total_{KP}} \quad PSSM = \qquad [1]$$

$$\frac{1}{9}\left(\sum_{i \in A} w1_i \times S(i)\right) + \left(w2 \times \frac{KP\_match}{total\_KP}\right)$$

where:
the set A comprises i={7, 8, 10, 11, 12, 13, 16, 18, 19},
where "i" corresponds to the process Pi, as described above with reference to FIGS. 1 & 2.; and $$S(i) = \frac{KP_{changed}}{total_{KP}} \quad [2]$$

$$S(i) = \frac{KP\_changed}{total\_KP}$$

except for the case of $$S(18) = \sum_{i=1}^{N} N * S_n(18) \text{ where}$$

$S_n(18) = S(18)$ considering different $KP$ lengths ($N$-grams with $N = n$)

where N is the maximum value of the N-grams used in P18.

The PSSM value may simply be the value that is generated by equation [1]. In one embodiment of the present invention, the PSSM value may be truncated such that the PSSM value is in the interval [0, 1], where 1.0 is high similarity and 0.0 is low similarity.

Referring to the two phrases that have been used in the foregoing discussion of the present invention (see phrases 2-5), the PSSM value calculated from equation [1] is 1.1, which may be truncated to the maximum value of 1.0. indicating a high degree of semantic similarity between phrases A & B, despite the lexical differences between the two phrases.

Table 6 below shows two further phrases; it will be readily understood by an English speaker that Phrase C is less similar to Phrase A than Phrase B is, whilst Phrase D is semantically different from Phrase A.

TABLE 6

Exemplary phrases and associated PSSM values

| Phrase A | the trainee contended for a spot in the special operations unit, but he did not meet required standards | N/A |
|---|---|---|
| Phrase B | although the cadet competed, he could not cut the mustard to serve in the special forces squad | 1.1 |
| Phrase C | the trainee competed for a position in the special operations unit, and successfully passed all required tests | 0.57 |

TABLE 6-continued

Exemplary phrases and associated PSSM values

| Phrase D | the cadet found a great training spot in the field operations building, but he did not have the required access to the building | 0.27 |
|---|---|---|

Table 6 also shows the PSSM values for Phrases B, C & D when compared with Phrase A. As discussed above, Phrase B has a high PSSM, which indicates that there is a strong semantic similarity between the two phrases. Phrase C has a PSSM value of 0.57, indicating that there is some semantic similarity between Phrases A & C, but less of a similarity than there is between Phrases A & B. Phrase D has a low PSSM, indicating that there is a minimal semantic similarity between the two phrases. Thus, it can be seen that the PSSM value is an accurate indicator of the degree of semantic similarity that exists between two different test phrases.

Appendix A below provides a full description of the operation of a method according to the first embodiment of the present invention on these phrases, along with the determination of the PSSM values.

During the execution of a method according to the present invention, the output from each of the processes may be stored in memory for subsequent retrieval and/or processing. In the event that the apparatus that executes the method is severely constrained in terms of the memory and/or data storage that is available then it may be appropriate to discard some of the results obtained from intermediate processes. It will be understood that it would be preferred to retain the outputs from those processes that are used directly in the calculation of the PSSM value (that is processes 7, 8, 10, 11, 12, 13, 16, 18 & 19 [see above]).

The method discussed above describes a method in which two phrases are compared. For an application that required comparisons of multiple passages against each other, then a higher-level process could invoke the method of the present invention in repeated loops. For example, if it was required to compare 3 passages, the method described above could be invoked with passage pairs (P1, P2), (P1, P3), and (P2, P3).

It will be apparent to those skilled in the relevant technical field that most of the individual processes (P1 to P19) described above are known. Suitable examples of implementations of each of these processes, or further details of how such processes may be implemented, are given in Table 7 below. It will be understood that the list given in Table 7 is not exhaustive or prescriptive, and that other alternative methods may be used as an alternative or in addition.

TABLE 7

Examples of process details

| Process | Exemplary Process Details |
|---|---|
| Contractions | http://rbeaudoin333.homestead.com/files/contractions/contractions_list_of_words_1.html |
| Acronyms | http://www.acronymfinder.com/ |
| Coreference Resolution | "*A Light-weight Approach to Coreference Resolution for Named Entities in Text*", M Dimitrov et al, Proceedings of the Fourth Discourse Anaphora and Anaphor Resolution Colloquium (DAARC), Lisbon, Portugal, 2003 http://www.gate.ac.uk/talks/daarc2002/gate-coref-slides.ppt |
| Idiomatic and Slang Expressions | http://www.usingenglish.com/reference/idioms/ http://onlineslangdictionary.com/browse/s |
| Named Entity Recognition | http://nlp.stanford.edu/ner/index.shtml |
| Negations | "*A Novel Hybrid Approach to Automated Negation Detection in Clinical Radiology Reports*", Huang Y., Lowe H. J. (2007) Journal of |

TABLE 7-continued

Examples of process details

| Process | Exemplary Process Details |
|---|---|
| | the American Medical Informatics Association, 14 (3). "*Sentiment Analyzer: Extracting Sentiments about a Given Topic using Natural Language Processing Techniques,*" Yi J., Nasukawa T., Bunescu R., Niblack W., Third IEEE International Conference on Data Mining (ICDM'03), 2003. |
| Part-of-speech Tagging | http://nlp.stanford.edu/software/tagger.shtml |
| Grammatical Parsing | http://nlp.stanford.edu/downloads/lex-parser.shtml<br>http://nlp.cs.berkeley.edu/Main.html#parsing |
| Perception-based Terms | Impacts w1 in PSSM equation 1 above (e.g. decrease weight for 'rarely' and increase weight for 'often') to differentiate semantic distance. Compared against pre-defined list of terms. "*Precisiating natural language for a question answering system,*" M. Thint, M., Beg M,, Qin Z., 11th World Multi Conference on Systemics, Cybernetics, and Informatics, Orlando, Florida, USA, July 8-11, 2007. |
| Modal Terms | Impacts w1 in PSSM equation 1 above (e.g. decrease weight for 'used to', 'might' and increase weight for 'must', 'going to') to differentiate semantic distance. Compared against pre-defined list of terms, for example, http://en.wikipedia.org/wiki/English_modal_auxiliary_verb |
| Stopword Removal | Search and remove words matching with pre-defined list of stopwords, for example http://truereader.com/manuals/onix/stopwords1.html. "*Tokenising, Stemming and Stopword Removal on Anti-spam Filtering Domain*" Mendez J., et al., Current Topics in Artificial Intelligence, Volume 4177, 2006. |
| Word Stemming | http://www.dcs.gla.ac.uk/idom/ir_resources/linguistic_utils/porter.c |
| Keyword Extraction | http://www.nzdl.org/Kea/ |
| Synonym Expansion | http://wordnet.princeton.edu/ |
| N-gram Inspection | Iterative comparison of adjacent words grouped N words at a time. http://en.wikipedia.org/wiki/N-gram<br>http://web.mst.edu/~tauritzd/ngram/tutorial.html |
| Limited explanation Expansion | Only a pre-determined length (e.g. first 2 sentences) of a text passage returned from an explanation source (e.g. wikipedia.com) is used as expanded description of key terms. |

As will be understood by those who are skilled in the art, the various individual processes described above in Table 7 are all known in the prior art. It should be understood that it is the functionality of each process that is important to the operation of the method according to the present invention, as opposed to the particular algorithm or implementation of a process. Thus, alternative techniques to those examples given above in Table 7 may be employed as long as they provide the same or equivalent functionality. The preceding discussion of the present invention has referred to the invention being carried out on textual phrases that are in English. The inventors of the present invention believe that the present invention is also applicable to languages other than English. It will be understood that equivalents to the processes and techniques described in Table 7 above will be required for these other languages. If such techniques are not available in the prior art it would be a straightforward task for a person skilled in the art to derive such processes and techniques based on an understanding of the corresponding process for the English language and the linguistic and grammatical differences between English and the other language of interest.

Figure 3:
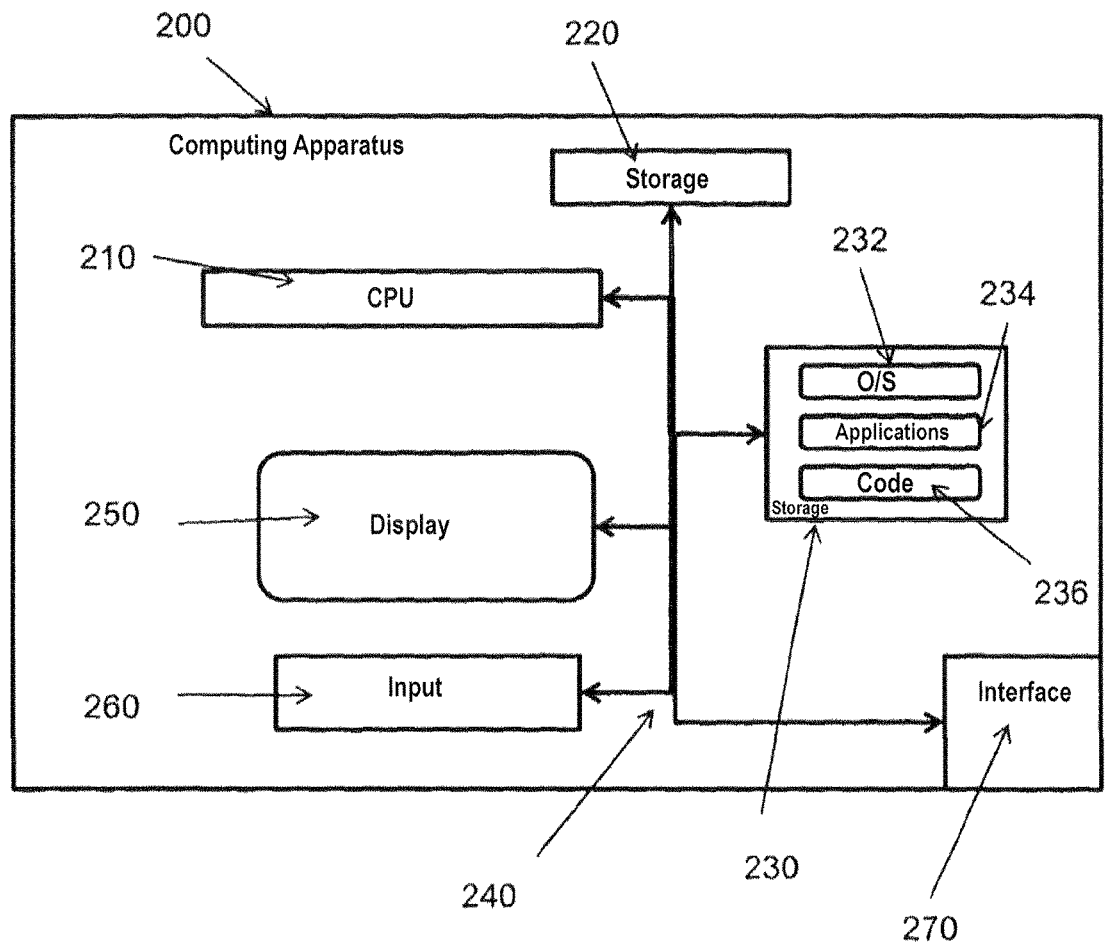
FIG. 3 shows a schematic depiction of a general purpose computing apparatus for executing a method according to the present invention.

A method according to the present invention will be implemented on a general purpose computing apparatus, such as a personal computer or a server computer which can be accessed by a client device or terminal. FIG. 3 shows a schematic depiction of such an apparatus 200, which comprises a central processing unit 210, volatile data storage means 220 and non volatile data storage means 230, which are interconnected by data bus 240. The apparatus further comprises display means 250, user input means 260 and network interface 270.

The non volatile data storage means 230 comprises an operating system 232 and one or more application programmes 234. The operating system comprises the software that the computing apparatus requires to operate, communicate with other computers, receive input from users, display outputs and results to users, etc. Application programs 234 can be executed by the apparatus in order to provide additional functionality. Non volatile data storage means 230 further comprises computer code 236 which can be executed in order to perform a method according to the present invention, for example such as the one described above.

It will be understood that the computer code 236 may comprise a single integrated application, or a number of different modules that are accessed separately to execute a method according to the present invention. Each module may perform the functionality of one or more of the processes which comprise the present invention. As discussed above, a number of the processes (processes P3, P4, P7, P8, P10-P13 & P19) will need to access a knowledge module in order to be able to function. These knowledge modules are preferably separate (or separable) from either the single integrated application or the relevant software module such that it is possible for a knowledge module to be updated or replaced without effecting the logic of the software that accesses a knowledge module. The content of these knowledge modules may be downloaded from publically available sources or purchased from suppliers (see Table 7 above). It is also possible for a knowledge module to comprise a core module which may be supplemented by one or modules which are specific to a particular technical or knowledge domain.

It will be readily apparent to those skilled in the art that the apparatus 200 may be implemented in a number of different ways. For example, the text phrases may be input into the apparatus, for example by a user with a keyboard and mouse. Alternatively, the text phrases may be received via the network interface from one or more other computer apparatuses (not shown). In one particular embodiment, text phrases that are comprised within a body of user generated content, for example text within blog posts, messages or updates on social networking sites, etc. may be analysed by the apparatus, with text from the user generated content being copied to the non volatile data storage means for storage and subsequent analysis.

In a further embodiment, the computer code which can be executed in order to perform a method according to the present invention may be stored on and executed by the apparatus that is used to host a social networking site, online forum, user generated content service, blogging site, messaging service, user service site etc. A method according to the present invention may be used to identify questions which have been asked regarding the properties or expected operation of goods and/or services provided by a company or organisation or complaints which have been made regarding goods which are faulty or have operated in an unexpected manner such that customer service agents may make an appropriate intervention. Alternatively, if a question can be matched to other semantically similar questions then it may be possible to direct a user to one or more answers which have been identified (for example by user feedback and rating) as providing a useful solution to the question. Furthermore, a method according to the present invention can be used in a document retrieval system. A submitted query or question can be analysed and compared with a number of queries that are held within such a document retrieval system. If the submitted question has sufficient semantic similarity to one (or more) of the queries held within the document retrieval system then the documents which are pertinent to the query (or queries) are returned to the user who submitted the question. It will be understood by a person skilled in the art that a method according to the present invention is of significant utility across a range of applications and that the present invention is not to be limited to the uses discussed above.

The apparatus may comprise integrated display means and user input means for example a touch screen, for they may be separate, for example a conventional display screen and a keyboard and/or mouse. The non volatile data storage means may comprise one or more hard disc drives; in addition there may be provided removable non volatile data storage means, such as removable hard disc drives or optical media (for example re-writable or recordable DVDs). The network interface may be a local area network adaptor, with the LAN being connected to other LANs and wide area networks (WANs) to enable the apparatus to communicate with and exchange data with other computers. Alternatively, the network interface may be a DSL modem, or similar, that provides a connection to a WAN, such as the internet or an intranet, which enables communications with further networks.

It will be understood that the exact structure of the general purpose computing apparatus is not important as long as it is capable of executing the computer code which performs a method according to the present invention. Such computer code may be deployed to such a general purpose computing apparatus via download, for example via the internet, or on some physical media, for example, DVD, CD-ROM, USB memory stick, etc.

APPENDIX A: EXEMPLARY DATA

NOTE: As phrases differ in content and expression, some procedures may not produce new technical effect on its input data. For example, a phrase that does not use contractions can not be further processed by Process 3 (Expand contraction), and a "No-op" label is used to indicate a no-operation change.

| | Process | Phrase A | Semantically Similar Phrase B |
|---|---|---|---|
| | | the trainee contended for a spot in the special operations unit, but he did not meet required standards | although the cadet competed, he could not cut the mustard to serve in the special forces squad |
| 1 | Exact Match? (case insensitive) | N/A | No |
| 2 | PSSM = 1.0 (if 1 is true) | No-op | No-op |
| 3 | Expand contractions | No-op | No-op |
| 4 | Resolve acronyms | No-op | No-op |
| 5 | Multiple sentences | No | No |
| 6 | Coreference resolution | the trainee contended for a spot in the special operations unit, but trainee did not meet required standards | although the cadet competed, cadet could not cut the mustard to serve in the special forces squad |
| 7 | Resolve idiomatic expressions | No-op | B1: although the cadet competed, cadet could not cut the mustard to serve in the special forces squad<br>B2: although the cadet competed, cadet could not meet required standards to serve in the special forces squad |
| 8 | Named entity recognition | No-op | No-op |

-continued

| Process | Phrase A | Semantically Similar Phrase B |
|---|---|---|
| 9 Parse and tag | (ROOT<br>(S<br> (S<br>  (NP (DT the) (NN trainee))<br>  (VP (VBD contended)<br>   (PP (IN for)<br>    (NP<br>     (NP (DT a) (NN spot))<br>     (PP (IN in)<br>      (NP (DT the) (JJ special) (NNS operations) (NN unit)))))))<br> (,,)<br> (CC but)<br> (S<br>  (NP (NN trainee))<br>  (VP (VBD did) (RB not)<br>   (VP (VB meet)<br>    (NP (JJ required) (NNS standards)))))))) | B1:<br>(ROOT<br> (SBAR (IN although)<br>  (S<br>   (NP (DT the) (NN cadet))<br>   (VP<br>    (VP (VBD competed))<br>    (,,)<br>    (S<br>     (NP (NN cadet))<br>     (VP (MD could) (RB not)<br>      (VP (VB cut)<br>       (NP (DT the) (NN mustard))<br>       (S<br>        (VP (TO to)<br>         (VP (VB serve)<br>          (PP (IN in)<br>           (NP (DT the) (JJ special) (NNS forces) (NN squad))))))))))))))<br>B2:<br>(ROOT<br> (SBAR (IN although)<br>  (S<br>   (NP (DT the) (NN cadet))<br>   (VP<br>    (VP (VBD competed))<br>    (,,)<br>    (S<br>     (NP (NN cadet))<br>     (VP (MD could) (RB not)<br>      (VP (VB meet)<br>       (NP<br>        (NP (VBN required) (NNS standards))<br>        (SBAR<br>         (S<br>          (VP (TO to)<br>           (VP (VB serve)<br>            (PP (IN in)<br>             (NP (DT the) (JJ special) (NNS forces) (NN squad)))))))))))))))) |
| 10 Apply equivalent entity labels | No-op | No-op |
| 11 Mark and resolve negations | the trainee contended for a spot in the special operations unit, but trainee did not (meet required standards) | B1: although the cadet competed, cadet could not (cut the mustard) to serve in the special forces squad<br>B2: although the cadet competed, cadet could not (meet required standards) to serve in the special forces squad |
| 12 Preserve perception based terms | No-op | No-op |
| 13 Preserve modal qualifiers | No-op | No-op |
| 14 Stopword removal (phrase delimiters (e.g. comma) mark where stopwords are removed. | trainee contended, spot, special operations unit, trainee, not (meet required standards) | B1: cadet competed, cadet, not (cut the mustard) serve special forces squad<br>B2:: cadet competed, cadet, not (meet required standards) serve special forces squad |
| 15 Stemming | trainee contend, spot, special operation unit,, trainee, not (meet required standards) | B1: cadet compete, cadet, not (cut the mustard), serve, special force squad<br>B2: cadet compete, cadet, not (meet required standards), serve, special force squad |
| 16 Keyword extraction | trainee, special operations, not (meet required standards) | B1: cadet, not (cut the mustard), special forces squad<br>B2: cadet, not (meet required standards), special forces squad |
| 17 Synonym expansion | trainee (contend, compete, vie) (spot, position, post, berth, office) (special, particular, peculiar, especial, exceptional, limited, extra) (operation, military operation, surgery, surgical operation, | B1: (cadet, plebe, military trainee) (compete, vie, contend) cadet not ((cut, separate, reduce, trim) (mustard, table mustard, Indian mustard)) (serve, function, help, attend to, wait on, assist, process, swear out) (special, particular, peculiar, especial, exceptional, limited, extra) (forces, personnel, military unit, military group) (squad, smallest army unit) |

-continued

| Process | Phrase A | Semantically Similar Phrase B |
|---|---|---|
| | procedure, functioning, performance) not ((meet, satisfy, fulfil) (required, needed, compulsory) (standards, criterion, measure, touchstone)) | B2: (cadet, plebe, military trainee) (compete, vie, contend) cadet not ((meet, satisfy, fulfil) (required, needed, compulsory) (standards, criterion, measure, touchstone)) (special, particular, peculiar, especial, exceptional, limited, extra) (forces, personnel, military unit, military group) (squad, smallest army unit) |
| 18 N-gram comparison | N/A trainee contended, spot, special operations unit, trainee, not (meet required standards) | B1: trainee contended, trainee not (cut the mustard), serve, special forces squad<br>B2:: trainee contended, trainee, not (meet required standards), serve, special forces squad |
| 19 Explanation expansion | N/A | Special forces (SF) and special operations forces (SOF) are generic terms for elite highly-trained military teams/units that... |
| 20 PSSM & computation | N/A trainee contended, spot, special operations unit, trainee, not (meet required standards) | B2:: trainee contended, trainee, not (meet required standards), serve, special forces squad = 1.0<br>Based on:<br>S(18) = 1(1/5) + 2(2/5) + 3(1/5); = 8/5<br>1/9(1/5 + 0 + 0 + 1/5 + 0 + 0 + 3/5 + 8/5 + 1/5) + 4/5 = 14/45 + 4/5 = 1.1 → 1.0 |

| Process | Less Similar Phrase C | Semantically Different Phrase D |
|---|---|---|
| | the trainee competed for a position in the special operations unit, and successfully passed all required tests | the cadet found a great training spot in the field operations building, but he did not have the required access to the building |
| 1 Exact Match? (case insensitive) | No | No |
| 2 PSSM = 1.0 (if 1 is true) | No-op | No-op |
| 3 Expand contractions | No-op | No-op |
| 4 Resolve acronyms | No-op | No-op |
| 5 Multiple sentences | No | No |
| 6 Coreference resolution | No-op | the cadet found a great training spot in the field operations building, but cadet did not have the required access to the building |
| 7 Resolve idiomatic expressions | No-op | No-op |
| 8 Named entity recognition | No-op | No-op |
| 9 Parse and tag | (ROOT<br> (S<br>  (NP (DT the) (NN trainee))<br>  (VP<br>   (VP (VBD competed)<br>    (PP (IN for)<br>     (NP<br>      (NP (DT a) (NN position))<br>      (PP (IN in)<br>       (NP (DT the) (JJ special) (NNS operations) (NN unit))))))<br>   (,,)<br>   (CC and)<br>   (VP<br>    (ADVP (RB successfully))<br>    (VBD passed)<br>    (NP (DT all) (VBN required) (NNS tests)))))) | (ROOT<br> (S<br>  (S<br>   (NP (DT the) (NN cadet))<br>   (VP (VBD found)<br>    (NP (DT a) (JJ great) (NN training) (NN spot))<br>    (PP (IN in)<br>     (NP (DT the) (NN field) (NNS operations) (NN building)))))<br>  (,,)<br>  (CC but)<br>  (S<br>   (NP (NN cadet))<br>   (VP (VBD did) (RB not)<br>    (VP (VB have)<br>     (NP<br>      (NP (DT the) (JJ required) (NN access))<br>      (PP (TO to)<br>       (NP (DT the) (NN building)))))))<br> (..))) |
| 10 Apply equivalent entity labels | No-op | No-op |

| Process | Less Similar<br>Phrase C | Semantically Different<br>Phrase D |
| --- | --- | --- |
| 11 Mark and resolve negations | No-op | the cadet found a great training spot in the field operations building, but cadet did not (have the required access) to the building |
| 12 Preserve perception based terms | No-op | No-op |
| 13 Preserve modal qualifiers | No-op | No-op |
| 14 Stopword removal (phrase delimiters (e.g. comma) mark where stopwords are removed. | trainee competed, position, special operations unit, successfully passed, required tests | cadet found, great training spot, field operations building, cadet, not (have the required access), building |
| 15 Stemming | trainee compete, position, special operation unit, successful passed, require tests | cadet found, great train spot, field operation build, cadet, not (have the required access), build |
| 16 Keyword extraction | trainee, special operations, required tests | cadet, training spot, field operations building, not (have the required access) |
| 17 Synonym expansion | trainee (contend, compete, vie) (position, post, berth, office, spot, billet, place, situation) (special, particular, peculiar, especial, exceptional, limited, extra) (operation, military operation, surgery, surgical operation, procedure, functioning, performance) (passed, go through, go across) (required, needed, compulsory) (tests, trial, run, tryout) | (cadet, plebe, military trainee) (found, discover, find, feel, regain) (training, preparation, grooming) (spot, topographic point, place) (field, battlefield, battleground) (operation, military operation, surgery, surgical operation, procedure, functioning, performance) (building, edifice) cadet not ((have, possess) (required, needed, compulsory) (access, entree)) |
| 18 N-gram comparison | trainee contended, position, special operations unit, successfully passed, required tests | trainee found, great training spot, field operations building, trainee, not (have the required access), building |
| 19 Explanation expansion | No-op | No-op |
| 20 PSSM & computation | trainee contended, position, special operations unit, successfully passed, required tests = 0.57<br>Based on<br>S(18) = 1(0) + 2(1/5) + 3(1/5); = 5/5<br>1/9(0 + 0 + 0 + 0 + 0 + 0 + 3/5 + 5/5 + 0) + 2/5 = 8/45 + 2/5 = 0.57 | trainee found, great training spot, field operations building, trainee, not (have the required access), building = 0.27<br>Based on<br>S(18) = 1(0) + 2(0) + 3(0); =0<br>1/9(0 + 0 + 0 + 1/5 + 0 + 0 + 4/5 + 0 + 0) + 0.8/5 = 5/45 + 0.8/5 = 0.27 |

What is claimed is:

1. A computer-implemented natural language processing method of determining a degree of semantic similarity between a first unstructured natural language text phrase and one or more second unstructured natural language text phrases, the first text phrase representing a question being asked by a user as received via a user interface, each said second text phrase representing a respective answered question, the method comprising:
   (a) analyzing the grammatical structure of the first unstructured natural language text phrase and each of the second unstructured natural language text phrases;
   (b) transforming the first unstructured natural language text phrase into a first keyword set by executing a first set of predefined program logic sequences on the first unstructured natural language text phrase;
   (c) transforming each said second unstructured natural language text phrase into a respective second keyword set by executing a second set of the predefined program logic sequences on each said second unstructured natural language text phrase to;
   (d) calculating, automatically and programmatically, a passage semantic similarity measure (PSSM) between the first text phrase and each of the second text phrases by selectively aggregating outputs from the execution of the first and second sets of predefined program logic sequences, and based on (I) the similarities between the grammatical structure of the first text phrase and the respective second text phrase, and (II) the similarities between the first keyword set and the respective second keyword set, wherein PSSM calculations are indicative of degrees of semantic similarity between two different phrases despite lexical differences between those two different phrases;
   (e) based on the calculated PSSM(s), matching the first text phrase with at least one of the one or more second text phrases; and
   (f) responding to the question being asked by the user via the user interface as represented by first text phrase, with an answer associated with the at least one matching second text phrase.

2. The method according to claim 1, further comprising expanding any contractions detected in (a) using at least one of the predefined program logic sequences.

3. The method according to claim 1, further comprising, for each idiomatic expression detected in (a), identifying one or more alternative expressions with a meaning similar to the respective detected idiomatic expression, using at least one of the predefined program logic sequences.

4. The method according to claim 1, further comprising, as a part of (a), parsing the grammatical structure of each text phrase and inserting part of speech tags in accordance with results of the parsing, using at least one of the predefined program logic sequences.

5. The method according to claim 1, further comprising, in (b) and (c), generating the first and second keyword sets by removing one or more stopwords from the respective text phrases, using at least one of the predefined program logic sequences.

6. The method according to claim 1, further comprising, in (b) and (c), generating the first and second keyword sets by stemming words comprising the respective text phrases, using at least one of the predefined program logic sequences.

7. The method according to claim 1, further comprising, in (b) and (c), generating the first and second keyword sets by extracting one of more keywords from the respective text phrases, using at least one of the predefined program logic sequences.

8. A computer-implemented natural language processing method of determining a degree of semantic similarity between a first unstructured natural language text phrase and a second unstructured natural language text phrase, the method comprising:
   (a) analyzing the grammatical structure of the first unstructured natural language text phrase and the second unstructured natural language text phrase;
   (b) transforming the first unstructured natural language text phrase into a first keyword set by executing a first set of predefined program logic sequences on the first unstructured natural language text phrase;
   (c) transforming the second unstructured natural language text phrase into a second keyword set by executing a second set of the predefined program logic sequences on the second unstructured natural language text phrase;
   (d) calculating, automatically and programmatically, a passage semantic similarity measure (PSSM) between the first text phrase and the second text phrase by selectively aggregating outputs from the execution of the first and second sets of predefined program logic sequences, and based on (I) the similarities between the grammatical structure of the first text phrase and the second text phrase, and (II) the similarities between the first keyword set and the second keyword set, wherein PSSM calculations are indicative of degrees of semantic similarity between two different phrases despite lexical differences between those two different phrases;
   (e) based on the calculated PSSM, determining the similarity of a first document including the first unstructured natural language text phrase, to a second document including the second unstructured natural language text phrase; and
   (f) generating a response to a user input query involving the determination of the degree of semantic similarity between the first unstructured natural language text phrase and the second unstructured natural language text phrase, based on the determined similarity of the first document to the second document.

9. The method according to claim 8, further comprising retrieving one or more documents in accordance with the semantic similarity between the first and second text phrases calculated in (d) and based on the determination in (e).

10. The method according to claim 1, wherein the semantic similarity between the first and second text phrases calculated in (d) is used to provide one or more answers in response to a received question.

11. An apparatus comprising a central processing unit, volatile data storage and non-volatile data storage, the central processing unit being configured to control the apparatus to perform a natural language processing program to determine a degree of semantic similarity between a first unstructured natural language text phrase and one or more second unstructured natural language text phrases in which the first text phrase represents a question being asked by a user as received via a user interface and in which each said second text phrase represents a respective answered question, by at least:
   (a) analyzing the grammatical structure of the first unstructured natural language text phrase and each of the second unstructured natural language text phrases;
   (b) transforming the first unstructured natural language text phrase into a first keyword set by executing a first set of predefined program logic sequences on the first unstructured natural language text phrase;
   (c) transforming each said second text phrase into a respective second keyword set by executing a second set of the predefined program logic sequences on each said second unstructured natural language text phrase;
   (d) calculating, automatically and programmatically, a passage semantic similarity measure (PSSM) between the first text phrase and each of the second text phrases by selectively aggregating outputs from the execution of the first and second sets of predefined program logic sequences, and based on: (I) the similarities between the grammatical structure of the first text phrase and the second respective text phrase, and (II) the similarities between the first keyword set and the respective second keyword set, wherein PSSM calculations are indicative of degrees of semantic similarity between two different phrases despite lexical differences between those two different phrases;
   (e) based on the calculated PSSM(s), matching the first text phrase with at least one of the one or more second text phrases; and
   (f) responding to the question being asked by the user via the user interface as represented by first text phrase, with an answer associated with the at least one matching second text phrase.

12. A non-transitory storage medium storing computer executable code executable by a computer to perform natural language processing functionality to determine a degree of semantic similarity between a first unstructured natural language text phrase and one or more second unstructured natural language text phrases, the first text phrase representing a question being asked by a user as received via a user interface, each said second text phrase representing a respective answered question, the functionality comprising:
   (a) analyzing the grammatical structure of the first unstructured natural language text phrase and each of the second unstructured natural language text phrases;
   (b) transforming the first unstructured natural language text phrase into a first keyword set by executing a first set of predefined program logic sequences on the first unstructured natural language text phrase;
   (c) transforming each said second unstructured natural language text phrase into a respective second keyword set by executing a second set of the predefined program logic sequences on each said second unstructured natural language text phrase;
   (d) calculating, automatically and programmatically, a passage semantic similarity measure (PSSM) between the first text phrase and each of the second text phrases by selectively aggregating outputs from the execution of the first and second sets of predefined program logic sequences, and based on (I) the similarities between the grammatical structure of the first text phrase and the respective second text phrase, and (II) the similarities between the first keyword set and the respective second keyword set, wherein PSSM calculations are indicative of degrees of semantic similarity between two different phrases despite lexical differences between those two different phrases;

(e) based on the calculated PSSM(s), matching the first text phrase with at least one of the one or more second text phrases; and (f) responding to the question being asked by the user via the user interface as represented by first text phrase, with an answer associated with the at least one matching second text phrase.

13. The apparatus according to claim 11, wherein at least one of the predefined program logic sequences is configured to expand any contractions detected in (a).

14. The apparatus according to claim 11, wherein at least one of the predefined program logic sequences is configured to identify, for each idiomatic expression detected in (a), one or more alternative expressions with a similar meaning.

15. The apparatus according to claim 11, wherein at least one of the predefined program logic sequences is configured, as a part of (a), to parse the grammatical structure of each text phrase and insert part of speech tags in accordance with results of the parsing.

16. The apparatus according to claim 11, wherein at least one of the predefined program logic sequences is configured, in (b) and (c) to generate said first and second keyword sets by removing one or more stopwords from the respective text phrases.

17. The apparatus according to claim 11, wherein at least one of the predefined program logic sequences is configured, in (b) and (c), to generate said first and second keyword sets by stemming words comprising the respective text phrases.

18. The apparatus according to claim 11, wherein at least one of the predefined program logic sequences is configured, in (b) and (c), to generate said first and second keyword sets by extracting one of more keywords from the respective text phrases.

19. The apparatus according to claim 11, wherein the semantic similarity between the first and second text phrases calculated in (d) is used to determine the similarity of a first document to a second document.

20. The apparatus according to claim 11, wherein the semantic similarity between the first and second text phrases calculated in (d) is used to provide one or more answers in response to a received question.

* * * * *